United States Patent [19]
Kizziar et al.

[11] 3,817,163
[45] June 18, 1974

[54] COOKING UTENSIL

[76] Inventors: Theodore C. Kizziar, 4622 Cambury Dr., La Palma, Calif. 90620; David W. Mays, 1290 Via Estrella, Palm Springs, Calif. 92262

[22] Filed: Sept. 27, 1971

[21] Appl. No.: 183,798

[52] U.S. Cl. .................................. 99/353, 99/427
[51] Int. Cl. ............................................ A47j 43/18
[58] Field of Search ............ 99/353, 349, 351, 386, 99/403–404, 411, 421 A, 426–427, 407, 409

[56] References Cited
UNITED STATES PATENTS

| | | | |
|---|---|---|---|
| 931,209 | 8/1909 | Lincoln | 99/409 X |
| 1,672,738 | 6/1928 | Stampley | 99/411 |
| 2,608,928 | 9/1952 | McDonnell | 99/421 A |
| 2,891,814 | 6/1959 | Idoine | 99/407 X |
| 2,892,655 | 6/1959 | Bower | 126/9 B UX |
| 3,020,826 | 2/1962 | Silva | 99/426 |
| 3,604,342 | 9/1971 | Harding | 99/426 |

Primary Examiner—Peter Feldman
Assistant Examiner—Arthur O. Henderson
Attorney, Agent, or Firm—Fulwider, Patton, Rieber, Lee and Utecht

[57] ABSTRACT

A cooking utensil used to prepare a taco shell within a frying pan has two arms pivoted together which close to sandwich a shell within a V-shaped holder. The arms, which may be swiveled together scissors-fashion, provide a handle disposed outwardly of the pan rim for manipulating the utensil, and the arms include a section with two juxtaposed oppositely facing, U-shaped sections or troughs, each with a horizontally disposed spanning segment for bridging the pan rim. The utensil is turned over between first and second horizontal cooking positions, and in each position the downwardly facing one of the trough segments bridges the rim.

9 Claims, 9 Drawing Figures

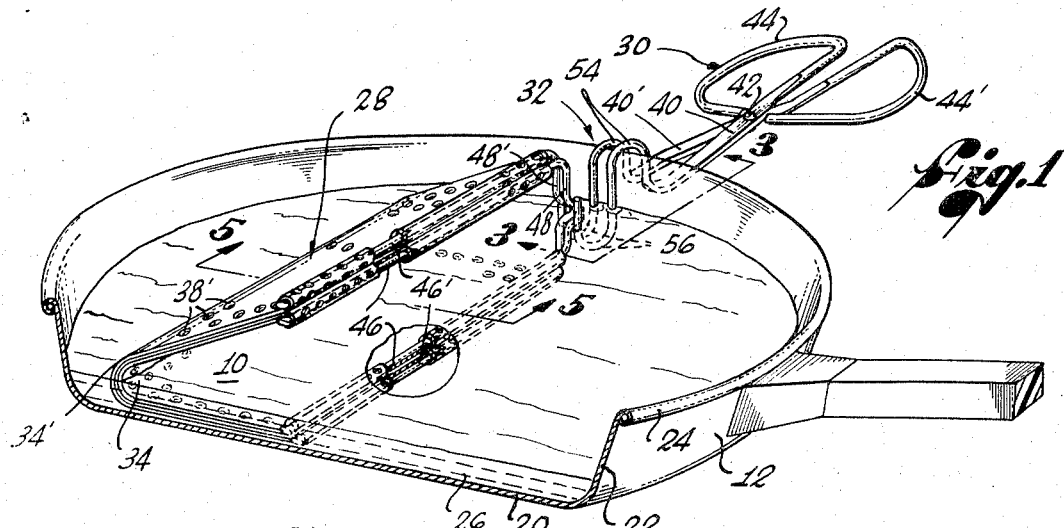
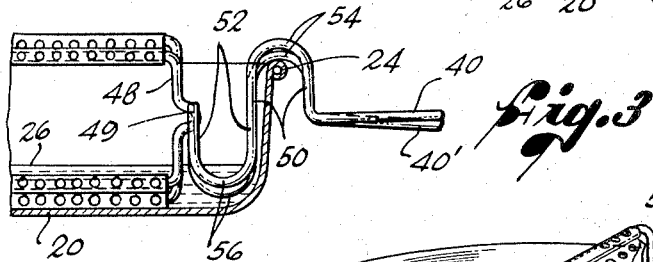
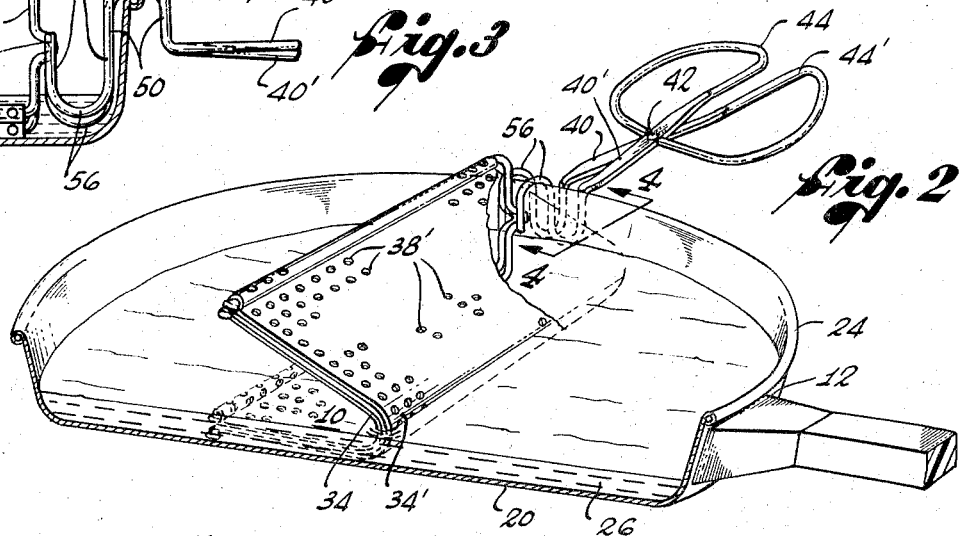
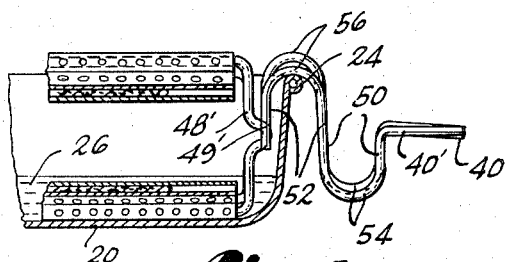
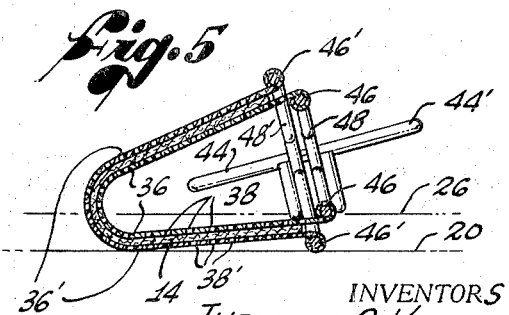

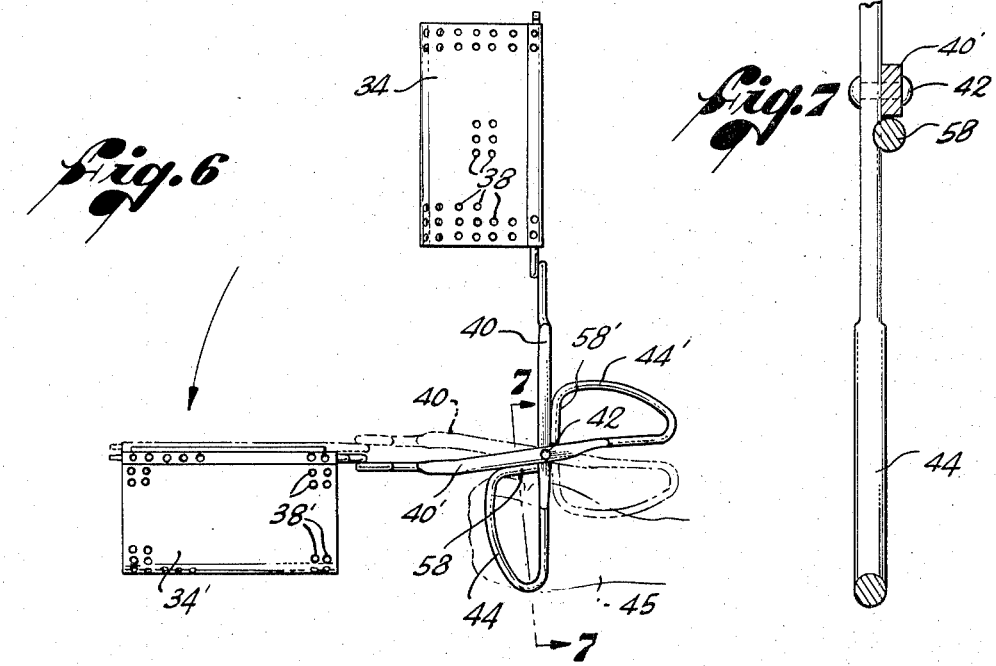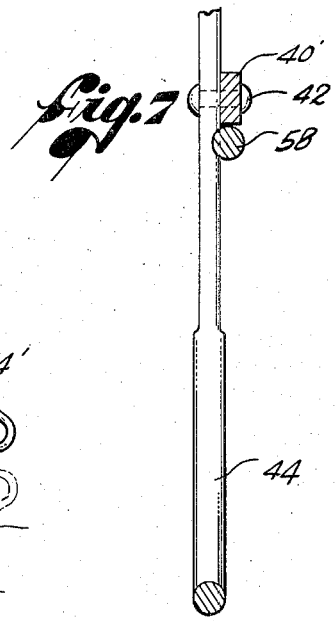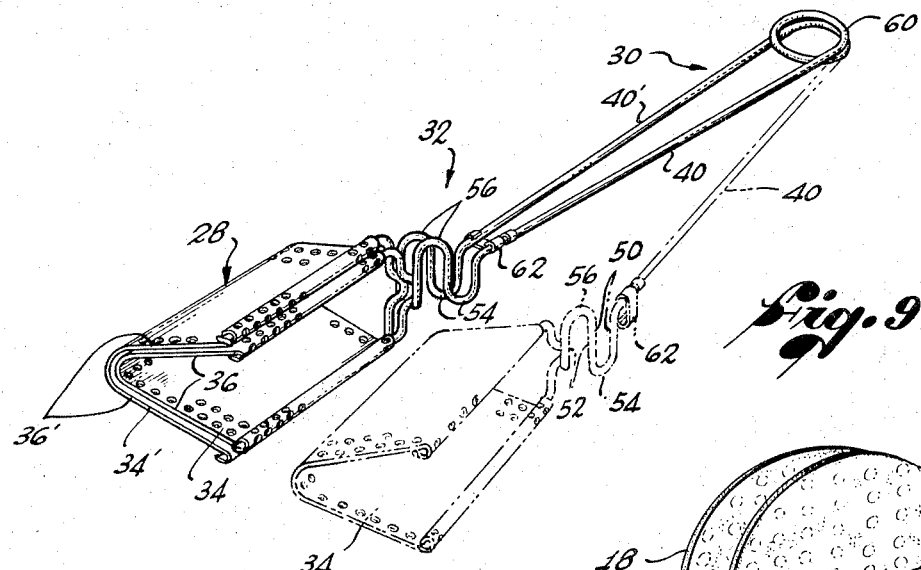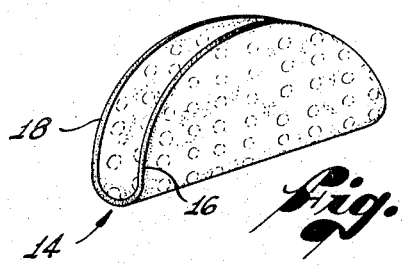

COOKING UTENSIL

BACKGROUND OF THE INVENTION

This invention relates to cooking utensils and, more particularly, to a utensil for holding a food item, such as a taco shell, within a frying pan.

Taco shells, formed from a tortilla folded in half in a general V-shape, have been prepared with a variety of utensils. Typically, with these utensils the shell is totally submerged in deep, hot cooking oil or the like and fried crisp. While there have been several utensils devised for frying taco shells in a shallow frying pan, these are not adapted to lie flat for frying in several cooking positions with a handle extending outwardly past the pan for readily manipulating the utensil and taco shell held thereby. Moreover, in some cases the utensil is situated entirely within the pan and must be handled by poking with a fork or other makeshift instrument, or by hand, in which case a person has poor control over the utensil and, additionally, runs the risk of being burned by the utensil or by oil spattering from the pan.

SUMMARY OF THE INVENTION

The present invention resides in a novel cooking utensil which is simple in construction, easy to use, and which includes a holder for supporting a food item, such as a taco shell, in a generally horizontal manner during preparation in a frying pan or the like. The utensil also includes a handle portion which extends outwardly past the pan rim for readily and safely manipulating the utensil between a first cooking position and a second inverted cooking position. The utensil has an intermediate portion with spanning segments designed to bridge the pan rim in each cooking position in a manner insuring horizontal disposition of the holder, so that cooking can be performed with a minimum of cooking oil or the like.

For these purposes, in the preferred embodiments of the invention the utensil is formed from two cooperating, rotatably connected arms which rotate between opened and closed positions and which together comprise the utensil handle portion. The holder portion preferably molds a taco shell into a V-shape and comprises two complementary, V-shaped, open frame members in the form of perforated screens rigidly attached to the respective arms by a frame support structure, and which nest together around the shell in their closed position. The handle is disposed outwardly of the pan rim by means of two horizontally disposed, vertically offset, spanning segments wiich bridge the pan rim in each respective cooking position. Preferably these spanning segments are formed as the base of oppositely facing troughs or U-shaped sections, and in each cooking position, the downwardly facing one of the troughs receives the upwardly extending pan sidewall with the pan rim adjacent and bridged by the spanning segment of this trough.

The utensil arms, in one embodiment, are swiveled together between the handle ends and operate in scissors-like fashion between opened and closed positions, and means is provided to limit the opening of the arms at a prescribed angle. In another form, the arms are rotatably connected at the handle end remote from the holder and are spring biased into an opened position, and means is provided for locking the arms in the closed position.

BRIEF DESCRIPTION OF THE DRAWINGS

FIG. 1 is a perspective view of a first embodiment of the cooking utensil of the invention arranged in a first cooking position within a frying pan, the pan being cut away in part to show the relatively shallow layer of cooking oil used with the utensil, and parts of the holder portion of the utensil cut away to show part of the holder supporting structure.

FIG. 2 is a perspective view similar to FIG. 1, but with the utensil turned over into an inverted second cooking position.

FIG. 3 is a view partly in elevation and partly in section along line 3—3 in FIG. 1, showing the utensil bridging the pan rim in the first cooking position.

FIG. 4 is a view partly in elevation and partly in section along line 4—4 in FIG. 2 showing the utensil bridging the pan rim in the inverted, second cooking position.

FIG. 5 is a sectional view along line 5—5 in FIG. 1 showing a taco shell held by the cooking utensil, and shows in dashed outline the frying pan bottom and cooking oil level.

FIG. 6 is a side elevational view of the cooking utensil in an opened position at a prescribed angle for receiving a taco shell with the closed position depicted in phantom.

FIG. 7 is a sectional view along line 7—7 of FIG. 6.

FIG. 8 is a perspective view of a tortilla folded in half in a general V-shape to form a taco shell.

FIG. 9 is perspective view of a second embodiment of the cooking utensil shown in the closed cooking position, with the open position depicted in phantom.

DESCRIPTION OF THE PREFERRED EMBODIMENTS

As shown in the drawings for purposes of illustration the invention is embodied in a cooking utensil 10 designed particularly for use with a frying pan 12 to prepare a taco shell 14 of the form shown in FIG. 8. The taco shell is formed by folding a tortilla in half in a general V-shape to obtain shell halves 16 and 18 on opposite sides of the fold. After frying both sides of the shell crisp, the shell is stuffed with a desired filling such as meat, tomatoes, lettuce and the like to form the taco.

The frying pan 12 has a bottom cooking surface 20 surrounded by an upwardly extending sidewall 22 terminating at its upper edge in rim 24. The taco shell 14 is fried, one half at a time, in a relatively shallow layer of cooking oil 26 or the like. For this purpose, the cooking utensil 10 includes a holder portion designated generally by numeral 28 for supporting the taco shell within the pan and a handle portion designated generally at 30 which extends outwardly past the pan rim 24 and is gripped by hand in order to manipulate the utensil during the cooking process. The utensil also includes an intermediate portion shown generally by numeral 32 which bridges the pan rim in a manner enabling the holder 28 to alternately position each half of the taco shell horizontally within the layer of cooking oil 26.

The holder 28 is shown as comprising two cooperating, relatively flat, open frame or screen members 34 and 34' each folded into a general V-shape to have a pair of flat sides 36, 36' (FIG. 5). In their closed position the screens nest one within the other with the taco shell 14 sandwiched in between as shown in FIG. 5, and the screens include openings or perforations 38, 38' which allow circulation of cooking oil to and around the taco shell. The holder 28 is initially placed in the first cooking postiion shown in FIGS. 1 and 5 with one-half of each screen and the taco shell half laid horizontally in the cooking oil. Thereafter, the holder is turned over into the inverted position shown in FIG. 2 to fry the remaining shell half.

The handle portion 30 of the utensil 10 is formed from two cooperating arms 40 and 40' which are swiveled together about a pin 42 intermediate the handle ends so that the arms operate in scissors-like fashion between an opened position (FIG. 6) and a closed cooking position (FIG. 1). The arms include respective enlarged loop portions 44 and 44' at one end which are grasped by hand to manipulate the utensil as well as rotate the arms 40 and 40' about pin 42.

The screen 34 is secured to arm 40 by means of a stiff, generally U-shaped supporting frame structure having two parallel prongs 46 connected by a base cross-bar 48. Each outer edge of the screen 34 is wrapped around and secured to a respective one of frame prongs 46, as shown in FIG. 5. In FIG. 1, part of the wrapped screen edges have been cut away to show the parallel prongs. The cross-bar 48 has a small bight portion 49 at its mid-point, as shown in FIG. 3 for example, and the arm 40 is welded or otherwise rigidly secured to this bight. The screen 34' is secured to its arm 40' by means of a similar frame having parallel prongs 46' joined by cross-bar 48'. As a result, the screens are rigidly mounted on the arms, and the scissors movement of the arms opens and closes the screens, To insure that the holder 28 will properly lie in each of its two flat positions within the frying pan 12, the intermediate utensil portion 32 is provided with a pair of vertically displaced, horizontally disposed, oppositely facing U-shaped sections or troughs. These sections are formed in each arm 40 and 40' and for simplicity of illustration the same numerals are used for each arm. As seen most clearly in FIGS. 3 and 4, the troughs have parallel side portions 50 and 52 and vertically offset bases 54 and 56. Each base serves as a generally horizontally disposed spanning segment for bridging the pan rim 24. In each cooking position the pan rim is received within the downwardly facing one of the troughs. Thus, in the first position of FIGS. 1 and 3, the rim 24 is received within sides 50 of the downwardly facing trough and is bridged by the horizontal spanning segment 54 of this trough. For the inverted position of FIGS. 2 and 4, the other trough with sidewalls 52 receives the rim, and the horizontal spanning segment 56 of this trough bridges the rim.

In operating the scissors embodiment fo FIGS. 1–7, it has been found helpful to limit the angle to which the arms 40 and 40' open. In FIGS. 6–7 this angle is set at about 90°, and for this purpose the terminal ends 58 and 58' of respective loop portions 44 and 44' are aligned to abut the opposing arm as it is opened to prevent further arm movement. The utensil may be held by the one loop portion 44 (as shown by the phantom hand 45 in FIG. 6), in which case the arm 40' and attached screen 34' drop open in the direction of the arrow until stopped by loop ends 58 and 58' engaging, respectively, arms 40' and 40. With the arm 40' and screen 34' held generally horizontally, the operator inserts or removes a taco shell with his other hand.

In a second embodiment of the invention, shown in FIG. 9, the two arms 40 and 40' of the utensil 10 are rotatably connected at the end of the handle portion 30 remote from the holder 28. In this version, the arms may be formed from one piece bent to form a spring section 60 connecting the arms. The arms are normally urged apart by the spring into the opened position shown in phantom in the Figure. The arms are forced inwardly by hand to sandwich a taco shell 14 between the screens 34 and 34'. In this position a catch 62, one end of which is rotatably mounted on arm 40, has its opposite end hooked around the arm 40' to hold the utensil closed against the spring bias.

The method of preparing a taco shell with the utensil 10 is evident from the foregoing description. In summary, the utensil arms are opened to separate the V-shaped screens 34 and 34', and a tortilla is laid between the screens. The utensil is then closed to sandwich the tortilla as a V-shaped shell between the screens, and the utensil is laid flat in a frying pan with one half of the shell in a shallow layer of cooking oil. After frying this side, the utensil is turned over to fry the remaining shell half. The arms are opened and the crisply fried shell is removed to be filled and eaten.

From the foregoing, it will be seen that the present invention provides a cooking utensil of relatively simple construction, which can prepare taco shells in a shallow frying pan. The utensil conveniently lies horizontally in two different cooking positions and is designed to be safely held and easily operated during all phases of the taco shell preparation. In addition, it will be apparent that while two preferred embodiments have been shown and described, various modifications and changes may be made without departing from the spirit and scope of the invention.

We claim:

1. A cooking utensil for frying taco shells and particularly adapted for use with a frying pan having a bottom cooking surface and a sidewall extending upwardly therefrom terminating in an upper pan rim, comprising:

a taco shell holder having first and second generally V-shaped, nestable, open frames between which the shell is sandwiched and held to form the shell in a V-shape with two halves joined along a fold which is encased between the nested frame members;

a handle portion comprising first and second cooperating arms secured respectively to said first and second taco holding frames, said arms being rotatably connected whereby said frames can be moved into and out of their nested position and whereby said taco holder can be manipulated to place the shell alternatively in a first cooking postion and a second cooking position inverted with respect to the first position, one half of the taco shell and holder being laid flat in said first cooking position and the other half of the shell and holder being laid flat in said second cooking position, whereby a relatively shallow layer of cooking oil is sufficient for frying the taco shell;

said cooperating arms having intermediate portions which are horizontally juxtaposed when said utensil is in use on a frying pan, each of which intermediate portions includes two vertically disposed, oppositely facing generally U-shaped troughs with horizontal bases providing horizontally disposed vertically offset spanning segments for respectively bridging the pan rim in said first and second cooking position whereby in each of said cooking positions there is a pair of downwardly facing horizontally juxtaposed troughs whose spanning segments bridge the pan rim to thereby enable said taco holder to lie generally flat in each of of said cooking positions with the handle located outwardly of the pan rim.

2. The cooking utensil of claim 1 in which:

the frame members each have a pair of outer edges, and a frame support structure is connected to each member along its outer edges, the support structure in turn being rigidly fastened to the respective arms to secure each frame member to its arm.

3. The cooking utensil of claim 2 in which:

the rotatably connected arms are pivoted together in scissors-fashion.

4. The cooking utensil of claim 3 and further including:

stop means for limiting the rotation of the cooperating arms.

5. The cooking utensil of claim 3 and further including:

spring means for normally biasing the arms in a direction to separate the frame members; and locking arms to secure the frame members in their closed position against the spring bias.

6. The cooking utensil of claim 1 and further including:

means for limiting the rotation of the arms to set the open angle of the frame member to a prescribed angle value.

7. The cooking utensil of claim 1 in which:

the rotatably connected arms and pivoted together in scissors-fashion.

8. The cooking utensil of claim 7 and further including:

means for limiting the rotation of the arms to set the open angle of the frame members to a prescribed angle value.

9. The cooking utensil of claim 1 in which:

the arms are connected at the handle end remote from the holder.

* * * * *